United States Patent
Lou et al.

(10) Patent No.: US 7,372,919 B1
(45) Date of Patent: May 13, 2008

(54) SPACE-TIME BLOCK DECODER FOR A WIRELESS COMMUNICATIONS SYSTEM

(75) Inventors: Hui-Ling Lou, Palo Alto, CA (US); Kok-Wui Cheong, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 857 days.

(21) Appl. No.: 10/667,632

(22) Filed: Sep. 22, 2003

Related U.S. Application Data (60) Provisional application No. 60/461,970, filed on Apr. 10, 2003.

(51) Int. Cl.
*H03D 3/22* (2006.01)

(52) U.S. Cl. .................................. 375/329

(58) Field of Classification Search ........... 375/329, 375/341, 316, 347, 349; 714/794, 795
See application file for complete search history.

(56) References Cited

U.S. PATENT DOCUMENTS

| | | | |
|---|---|---|---|
| 5,602,601 A * | 2/1997 | Kim et al. ............... | 348/607 |
| 6,177,906 B1 | 1/2001 | Petrus | |
| 6,301,293 B1 | 10/2001 | Huang et al. | |
| 6,393,073 B1 | 5/2002 | Eilts | |
| 6,522,683 B1 | 2/2003 | Smee et al. | |
| 7,043,681 B2 * | 5/2006 | Kroeger .................. | 714/786 |
| 2002/0136327 A1 * | 9/2002 | El-Gamal et al. ......... | 375/308 |
| 2003/0223353 A1 * | 12/2003 | Wallace .................. | 370/206 |
| 2006/0274846 A1 * | 12/2006 | Bauch .................... | 375/267 |

FOREIGN PATENT DOCUMENTS

EP 1119146 A2 7/2001

OTHER PUBLICATIONS

"802.16 IEEE Standard for Local and Metropolitan Area Networks; Part 16: Air Interface for Fixed Broadband Wireless Access Systems," 802.16 IEEE Standard for Local and Metropolitan Area Networks, Oct. 1, 2004, pp. i-xxxiv and pp. 1-857, IEEE Std 802.16-2004, IEEE, United States.

IEEE Standard 802.11a (1999; 91 pages); Supplement to IEEE Standard for Information Technology; Telecommunications and Information Exchange Between Systems; Local and Metropolitan Area Networks; Specific Requirements; Part 11: Wireless LAN Medium Access Control (MAC) and Physical Layer (PHY) Specifications; High-Speed Physical Layer in the 5 GHz Band; Adopted by the ISO/IEC and redesignated as ISO/IEC 8802-11:1999/Amd 1:2000(E).

(Continued)

*Primary Examiner*—Khai Tran (57) ABSTRACT

A space-time block decoder for a wireless communications system includes a demodulator that generates a demodulated symbol sequence by derotating a signal constellation of a received symbol sequence. A dimension demultiplexer that communicates with the demodulator generates in-phase and quadrature components of the demodulated symbol sequence. A one-dimensional dynamic slicer that communicates with the dimension demultiplexer generates constellation points in the signal constellation based on the in-phase and quadrature components. A bit mapping module that communicates with the one-dimensional dynamic slicer maps the constellation points to user data bits.

70 Claims, 9 Drawing Sheets

OTHER PUBLICATIONS

"Part 16: Air Interface for Fixed Broadband Wireless Access Systems—Medium Access Control Modifications and Additional Physical Layer Specifications for 2-11 GHz", P802.16a/D6-2002, Draft Amendment to IEEE Standard for Local and Metropolitan Area Networks, Oct. 27, 2002, pp. 1-309.

Lou/Cheong/Shirali/Narasimhan, "On division-free frequency domain equalization and Viterbi decoding using channel state information" Mar. 8, 2002, pp. 1-18.

Siavash M. Alamouti, "A Simple Transmit Diversity Technique for Wireless Communications", IEEE Journal on Select Areas in Communications, vol. 16, No. 8, Oct. 1998, pp. 1451-1458.

Tarokh/Jafarkhani/Calderbank, "Space-Time Block Codes from Orthogonal Designs", IEEE Transactions on Information Theory, vol. 45, No. 5, Jul. 1999, pp. 1456-1467.

Tarokh/Jafarkhani/Calderbank, "Space-Time Block Coding for Wireless Communications: Performance Results", IEEE Journal on Selected Areas in Communications, vol. 17, No. 3, Mar. 1999, pp. 451-460.

* cited by examiner

SPACE-TIME BLOCK DECODER FOR A WIRELESS COMMUNICATIONS SYSTEM

CROSS-REFERENCE TO RELATED APPLICATIONS

This application claims the benefit of U.S. Provisional Application No. 60/461,970, filed on Apr. 10, 2003, which is hereby incorporated by reference in its entirety.

FIELD OF THE INVENTION

The present invention relates to wireless communications systems, and more particularly to space-time decoders for wireless communications systems that have multiple transmit antennae.

BACKGROUND OF THE INVENTION

Space-time coding is used in wireless communications systems that include multiple receive and/or transmit antennae. Space-time codes exploit the spatial diversity of wireless systems by taking advantage of multiple transmission paths between transmitters and receivers. Systems that implement space-time block coding transmit blocks that include a predetermined number of symbols. While space-time block coding may be used to increase the data rate of the communications system, space-time block codes are commonly used to add redundancy to wireless data transmissions and to increase the power of transmissions. This increases the reliability of wirelessly transmitted data and increases the range of the communications system.

For example, wireless access systems according to the IEEE 802.16a standard, which is hereby incorporated by reference in its entirety, enable the use of space-time block codes that utilize two transmit antennae. Additionally, there is interest in applying space-time block coding to next-generation wireless local area networks (WLANs).

Figure 1:
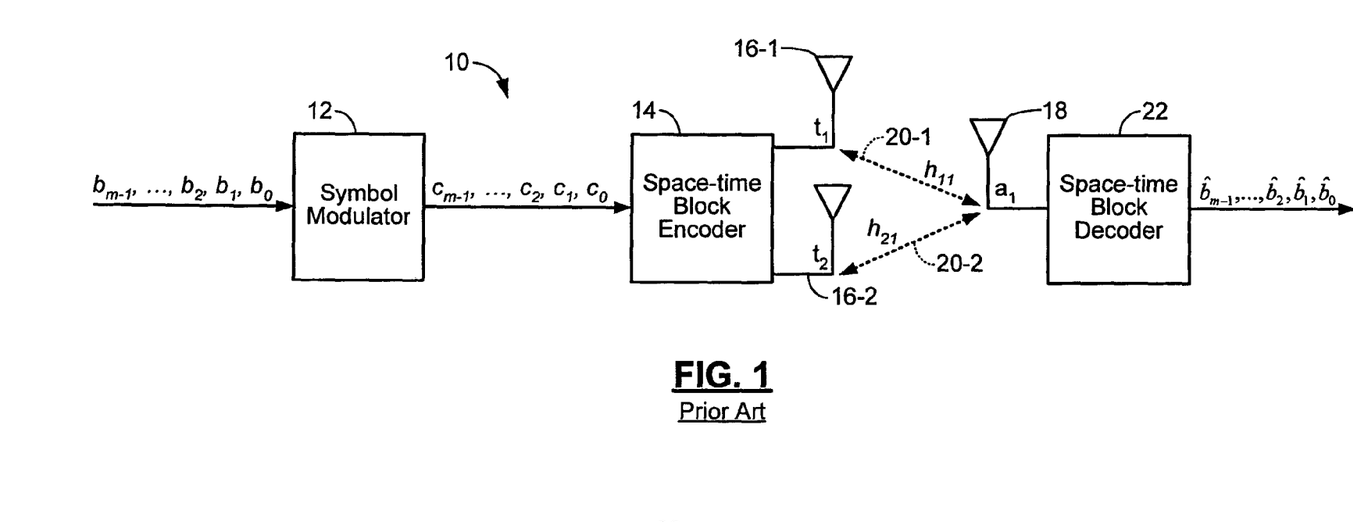
FIG. 1 is a block diagram of a wireless communications system that implements space-time block coding with two transmit antennae and one receive antenna according to the prior art.

Referring now to FIG. 1, a first wireless communications system 10 includes a symbol modulator 12. An input of the symbol modulator 12 receives user data. The symbol modulator 12 maps the user data to constellation points of a signal constellation and generates a symbol sequence $c=\{c_0, c_1, c_2, \ldots, c_{m-1}\}$ comprising m symbols. The symbol modulator 12 outputs the symbol sequence c to an input of a space-time block encoder 14. The space-time block encoder 14 generates blocks that include one or more symbols, as will be described further below. The blocks are transmitted by first and second transmit antennae 16-1 and 16-2, respectively, during one or more symbol periods.

In one configuration, the space-time block encoder 14 implements a rate-1 orthogonal space-time block code. The rate R=k/p is the ratio of the number of symbols k in a block to the number of symbol periods p that are required to transmit the k symbols. For example, one space-time block encoder encodes two symbols per block according to $$G_2 = \begin{bmatrix} x_1 & x_2 \\ -x_2^* & x_1^* \end{bmatrix},$$

where $x_1$ and $x_2$ are first and second consecutive symbols, respectively, in the symbol sequence c. The first and second transmit antennae 16-1 and 16-2, respectively, transmit $x_1$ and $x_2$ during two consecutive symbol periods. For example, during a first symbol period, the first transmit antenna 16-1 transmits $c_0$ and the second transmit antenna 16-2 transmits $c_1$. During a second symbol period, the first antenna 16-1 transmits $-c_1^*$ and the second antenna 16-2 transmits $c_0^*$, where $c_0^*$ and $c_1^*$ are the complex conjugates of $c_0$ and $c_1$, respectively. The space-time block encoder 14 transmits complex conjugates of the symbols to add redundancy and to allow a receiver to reconstruct the signal in the event that a transmission path fades. Likewise, symbols $c_2$ and $c_3$ are transmitted during two successive symbol periods.

Receive antenna 18 receives a first signal transmission through $h_{11}$, illustrated at 20-1, and a second signal transmission through $h_{21}$, illustrated at 20-2, where $h_{ij}$ is the channel state information between transmit antenna i and receive antenna j during a symbol period. During symbol period 2n, where n=0, 1, 2, ..., S−1, receive antenna 18 receives symbol $r_{2n}$, which is expressed as $r_{2n}=h_{11}c_{2n}+h_{21}c_{2n+1}+n_{2n}$. During symbol period (2n+1), receive antenna 18 receives symbol $r_{2n+1}$, which is expressed as $r_{2n+1}=-h_{11}c_{2n+1}^*+h_{21}c_{2n}^*+n_{2n+1}$. In the equations for $r_{2n}$ and $r_{2n+1}$, $n_{2n}$ and $n_{2n+1}$, respectively, denote additive white Gaussian noise. This assumes that 2S symbols are transmitted during 2S symbol periods. Expressed in matrices, receive antenna 18 receives symbol sequence r during two consecutive symbol periods, where $$r = \begin{bmatrix} r_{2n} \\ r_{2n+1}^* \end{bmatrix} = \begin{bmatrix} h_{11} & h_{21} \\ h_{21}^* & -h_{11}^* \end{bmatrix} \begin{bmatrix} c_{2n} \\ c_{2n+1} \end{bmatrix} + \begin{bmatrix} n_{2n} \\ n_{2n+1}^* \end{bmatrix} = H \cdot c + n.$$

An input of a space-time block decoder 22 receives received symbol sequence $r_1$ and the space-time block decoder 22 outputs user data bits $b=\{b_0, b_1, b_2, \ldots, b_{m-1}\}$ based on r.

Figure 2:
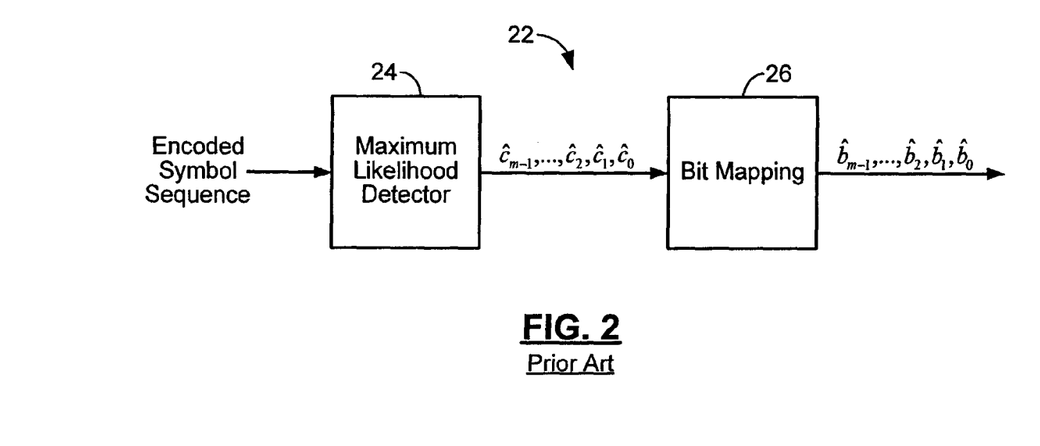
FIG. 2 is a block diagram of a space-time block decoder that includes a maximum likelihood detector according to the prior art.

Referring now to FIG. 2, in one approach, the space-time block decoder 22 includes a maximum likelihood (ML) detector 24 and a bit mapping module 26. The ML detector 24 makes a symbol decision based on a continuous stream of quantized encoded symbols. The ML detector 24 utilizes squared Euclidean distances as ML decision metrics to decode the received symbols. When there is one receive antenna, equivalent and independent decision metrics for $c_{2n}$ and $c_{2n+1}$ are derived. For example, decision metric $|r^{2n}-h_{11}c_{2n}-h_{21}c_{2n+1}|^2+|r_{2n+1}+h_{11}c_{2n+1}^*-h_{21}c_{2n}^*|^2$ is derived by squaring the additive white Gaussian noise of $r_{2n}$ and $r_{2n+1}$ and summing the two values. After deleting terms that are independent of the codewords and rearranging the equation, the decision metric for $c_{2n}$ is $$|(h_{11}^* r_{2n} + h_{21} r_{2n+1}^*) - c_{2n}|^2 + (-1 + |h_{11}|^2 + |h_{21}|^2)|c_{2n}|^2.$$

The bit mapping module 26 maps constellation points that are output by the ML detector 24 to user data bits. However, the independent decision metrics for $c_{2n}$ and $c_{2n+1}$ require complex computations. For example, the decision metric for $c_{2n}$ includes complex conjugate multiplication and squaring operations. These complex computations make the implementation of the ML detector 24 very complicated.

SUMMARY OF THE INVENTION

A space-time block decoder for a wireless communications system includes a demodulator that generates a demodulated symbol sequence by derotating a signal constellation of a received symbol sequence. A dimension demultiplexer that communicates with the demodulator generates in-phase and quadrature components of the demodulated symbol sequence. A one-dimensional dynamic slicer that communicates with the dimension demultiplexer generates constellation points in the signal constellation based on the in-phase and quadrature components.

In other features, the space-time block decoder individually decodes symbols in the received symbol sequence as a receiver that communicates with the space-time block decoder receives the received symbol sequence. The demodulator derotates the signal constellation by multiplying the received symbol sequence and a conjugate of a channel response of the wireless communications system. The one-dimensional dynamic slicer generates the constellation points by comparing the in-phase and quadrature components to integer multiples of a magnitude square of the channel response. A receiver that communicates with the space-time block decoder includes one receive antenna and a transmitter that communicates with the receiver includes two transmit antennae. The receive antenna receives two symbols during first and second consecutive symbol periods.

In still other features, a receiver that communicates with the space-time block decoder includes at least two receive antennae and a transmitter that communicates with the receiver includes two transmit antennae. A receiver that communicates with the space-time block decoder includes at least two receive antennae and a transmitter that communicates with the receiver includes at least two transmit antennae.

In still other features, at least one symbol in the received symbol sequence is encoded with an orthogonal space-time code. The signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

In yet other features, the space-time block decoder is implemented in a wireless metropolitan area network (WMAN). The space-time block decoder is implemented in a wireless local area network (WLAN). The space-time block decoder scales the in-phase and quadrature components to implement a normalized power scale that is based on the signal constellation. The constellation points are Gray coded. A bit mapping module that communicates with the one-dimensional dynamic slicer maps the constellation points to user data bits.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements.

When a channel response H is orthogonal, a received symbol sequence r may be demodulated by determining the product of r and a conjugate of the channel response H*. The resulting demodulated symbol sequence includes demodulated symbols $z_1$ and $z_2$, which may be expressed as $$\begin{bmatrix} z_1 \\ z_2 \end{bmatrix} = H^*r = \begin{bmatrix} h_{11}^* r_{2n} + h_{21} r_{2n+1}^* \\ h_{21}^* r_{2n} - h_{11} r_{2n+1}^* \end{bmatrix} =$$

$$(|h_{11}|^2 + |h_{21}|^2) \begin{bmatrix} c_{2n} \\ c_{2n+1} \end{bmatrix} + \begin{bmatrix} h_{11}^* n_{2n} + h_{21} n_{2n+1}^* \\ h_{21}^* n_{2n} - h_{11} n_{2n+1}^* \end{bmatrix}.$$

A resultant noise vector is uncorrelated with a noise autocorrelation matrix $$R_{\overline{nn}} = (|h_{11}|^2 + |h_{21}|^2)\sigma^2 I,$$

where $\sigma^2$ is the noise variance of the original noise and I is a 2×2 identity matrix. Since symbols $c_{2n}$ and $c_{2n+1}$ have independent decision metrics, $c_{2n}$ and $c_{2n+1}$ may be determined independently. Additionally, there is no concatenated outer code such as a convolutional code or a trellis coded modulation (TCM) code that imposes a symbol sequencing order. Therefore, unlike a decoder including an ML detector, decoding can be done on a symbol-by-symbol basis, and a slicer can make a hard symbol decision without a loss in decoder performance.

Figure 3:
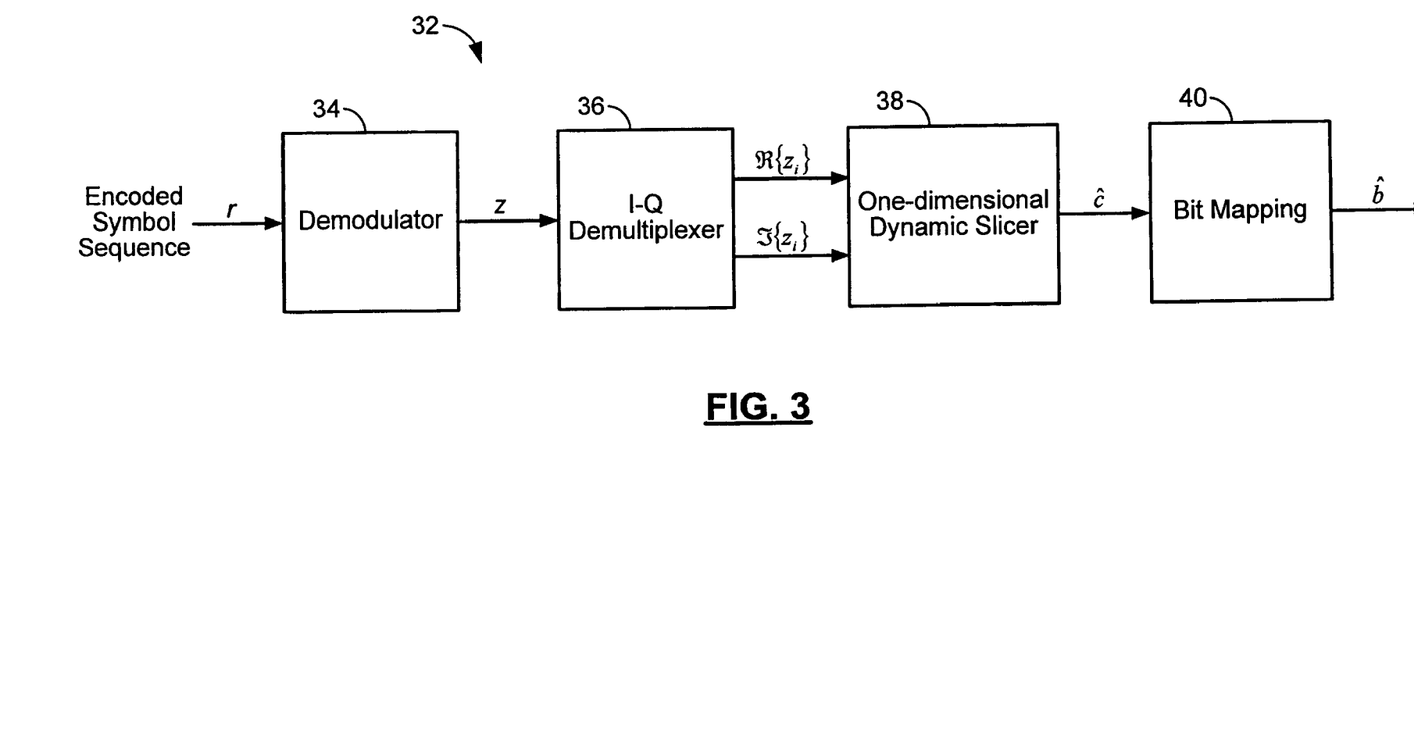
FIG. 3 is a block diagram of a space-time block decoder that includes a one-dimensional dynamic slicer according to the present invention.

Referring now to FIG. 3, a space-time block decoder 32 according to the present invention includes a demodulator 34, a I-Q demultiplexer 36, a one-dimensional dynamic slicer 38, and a bit mapping module 40. The demodulator 34 multiplies the received symbol sequence r by a conjugate of the channel response H*. This derotates a signal constellation of the received symbol sequence r and results in a scaling factor that is multiplied by symbols $c_{2n}$ and $c_{2n+1}$. The result is a demodulated symbol sequence z that is decoupled, which allows for decoding on a symbol-by-symbol basis.

Figure 4:
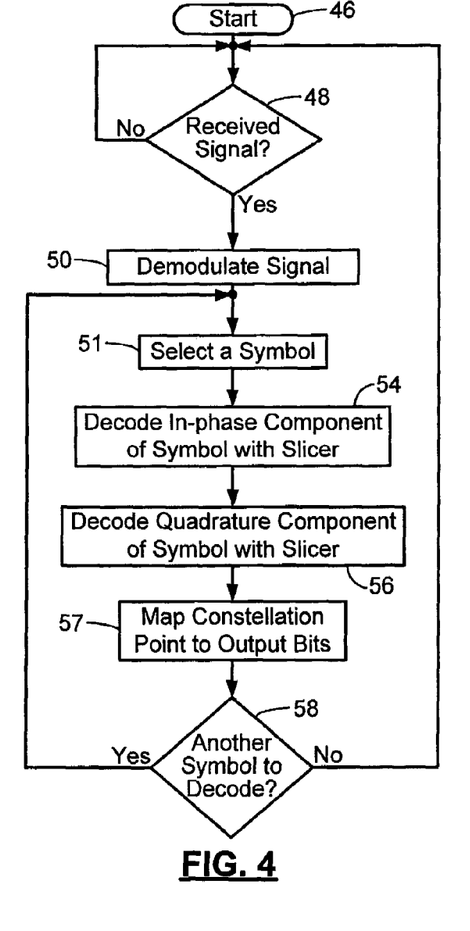
FIG. 4 is a flowchart illustrating steps performed by the space-time block decoder of FIG. 3.

The demodulator 34 outputs demodulated symbol sequence z to the I-Q demultiplexer 36. The I-Q demultiplexer 36 selects a demodulated symbol $z_i$ in the demodulated symbol sequence z and outputs one of an in-phase and quadrature component of the demodulated symbol $z_i$. For example, $\Re\{z_i\}$ is the in-phase component of demodulated symbol $z_i$, and $\Im\{z_i\}$ is the quadrature component of demodulated symbol $z_i$. The I-Q demultiplexer 36 independently outputs the in-phase and quadrature components of demodulated symbol $z_i$ to the one-dimensional dynamic slicer 38. For example, the one-dimensional dynamic slicer 38 separately processes $\Re\{z_1\}$ and $\Im\{z_1\}$ to generate constellation points in an implemented signal constellation. The one-dimensional dynamic slicer 38 makes a hard symbol decision by comparing $\Re\{z_1\}$ and $\Im\{z_1\}$ to integer multiples of $|H|^2$ in decision boundaries. The decision boundaries are established by the current signal constellation. While a single one-dimensional dynamic slicer is shown in FIG. 4, an additional one-dimensional dynamic slicer may be implemented to simultaneously process $\Re\{z_1\}$ and $\Im\{z_1\}$ in a parallel structure. This method applies to all orthogonal space-time block codes. The bit mapping module 40 receives constellation points from the one-dimensional dynamic slicer and maps the constellation points to user data bits b.

Referring now to FIG. 4, a decoding algorithm that is implemented in the space-time block decoder 32 begins in step 46. In step 48, control determines whether a signal was received. If false, control loops to step 48. If true, control proceeds to step 50. In step 50, the demodulator 34 demodulates the received signal. In step 51, the I-Q demultiplexer selects a demodulated symbol from a demodulated symbol sequence. In step 54, the I-Q demultiplexer 36 outputs the in-phase component of the demodulated symbol and the one-dimensional dynamic slicer 38 determines the in-phase component of the constellation point that is associated with the demodulated symbol. In step 56, the I-Q demultiplexer 36 outputs the quadrature component of the demodulated symbol and the one-dimensional dynamic slicer 38 determines the quadrature component of the constellation point that is associated with the demodulated symbol. Steps 54 and 56 can be performed in parallel. In step 57, the bit mapping module 40 maps the constellation point that is generated by the one-dimensional dynamic slicer 38 to user data bits. In step 58, control determines whether there is another symbol to decode in the demodulated symbol sequence. If true, control returns to step 51. If false, control returns to step 48.

Figure 5:
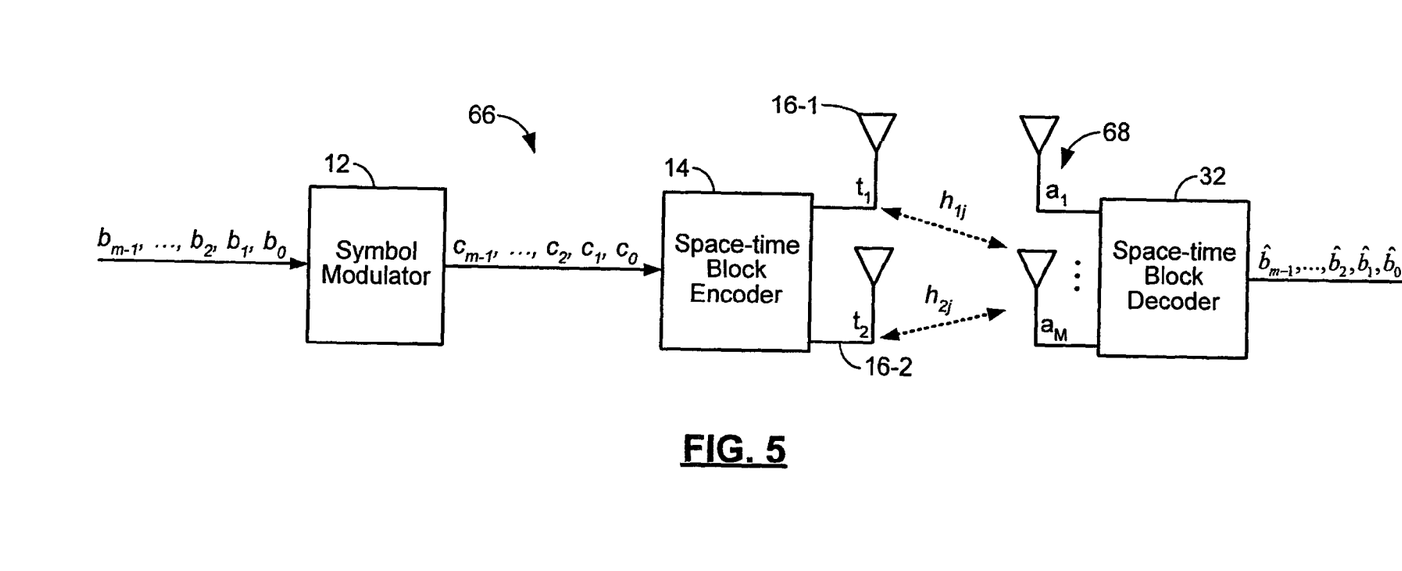
FIG. 5 is a block diagram of a wireless communications system that implements space-time block coding with two transmit antennae and at least two receive antennae.

Referring now to FIG. 5, a second wireless communications system 66 includes the first and second transmit antennae 16-1 and 16-2, respectively, and M receive antennae 68, where M is greater than or equal to two. In the case of multiple receive antennae, the demodulated symbol sequence expression is altered. The result is a modified scaling factor multiplied by the decoded symbols. With M receive antennae, $$\begin{bmatrix} \hat{z}_1 \\ \hat{z}_2 \end{bmatrix} = \sum_{j=1}^{M} H_j^* r_j = \left( \sum_{j=1}^{M} \sum_{i=1}^{2} |h_{ij}|^2 \right) \begin{bmatrix} c_{2n} \\ c_{2n+1} \end{bmatrix} + \begin{bmatrix} \sum_{j=1}^{M} \tilde{n}_{2n,j} \\ \sum_{j=1}^{M} \tilde{n}_{2n+1,j} \end{bmatrix},$$

where $r_j$ expresses the symbols received at receive antenna j during symbol periods 2n and (2n+1) and where $$H_j = \begin{bmatrix} h_{1j} & h_{2j} \\ h_{2j}^* & -h_{1j}^* \end{bmatrix}.$$

Symbols $c_{2n}$ and $c_{2n+1}$ are decoupled, and in-phase and quadrature components of the demodulated symbol sequence may be independently processed by the one-dimensional dynamic slicer 38. Therefore, the one-dimensional dynamic slicer 38 determines decoded symbols $\hat{c}_{2n}$ and $\hat{c}_{2n+1}$, and the bit mapping module 40 determines the user data bits that are associated with decoded symbols $\hat{c}_{2n}$ and $\hat{c}_{2n+1}$. In this case, the in-phase and quadrature components of the demodulated symbol sequence and the decision boundaries of the one-dimensional dynamic slicer 38 are integer multiples of $$|H|^2 = \left( \sum_{j=1}^{M} \sum_{i=1}^{2} |h_{ij}|^2 \right).$$

Figure 6:
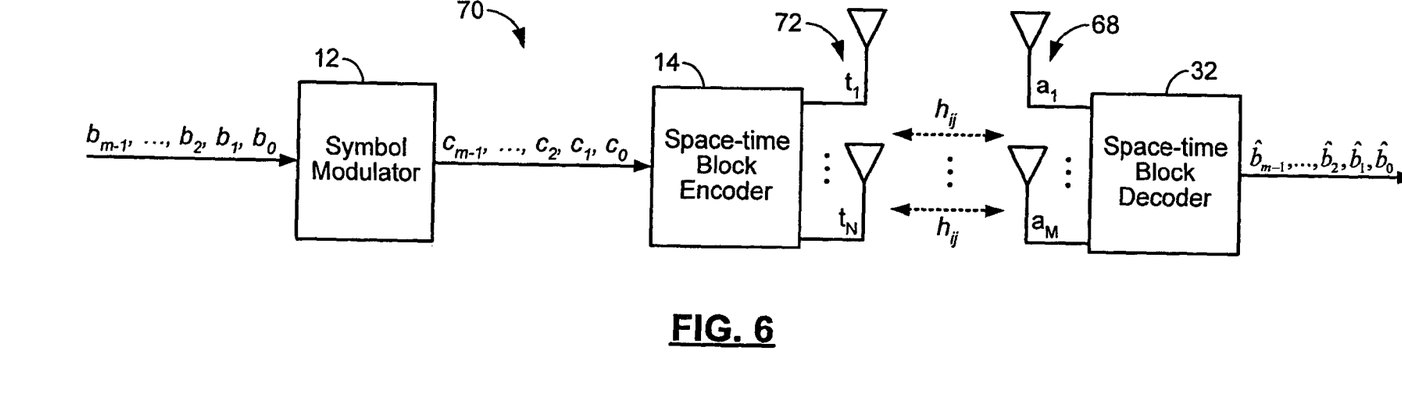
FIG. 6 is a block diagram of a wireless communications system that implements space-time block coding with at least two transmit antennae and at least two receive antennae.

Referring now to FIG. 6, a third wireless communications system 70 includes at least two transmit antennae 72 and at least two receive antennae 68. Since all known space-time block codes are based on orthogonal code, the present invention is applicable to orthogonal codes other than $$G_2 = \begin{bmatrix} x_1 & x_2 \\ -x_2^* & x_1^* \end{bmatrix}.$$

Several orthogonal codes allow for more than two transmit antennae and multiple receive antennae. For example, rate-½ and rate-¾ block codes may be employed.

In the case of multiple transmit and multiple receive antennae, the demodulated symbol sequence expression is altered. A modified scaling factor is multiplied by the decoded symbols. With N transmit antennae and M receive antennae, $$\hat{z}_i = \left( \sum_{j=1}^{M} \sum_{i=1}^{N} |h_{ij}|^2 \right) c_i + \tilde{n}_i,$$

where demodulated symbol $\hat{z}_i$ corresponds to transmitted symbol $c_i$ (i=0, 1, 2, . . . , k–1). Therefore, symbol $c_i$ may be independently decoded, and in-phase and quadrature components of symbol $c_i$ may be independently processed by the one-dimensional dynamic slicer 38. The one-dimensional dynamic slicer 38 determines decoded symbol $c_i$, and the bit mapping module 40 determines the user data bits that are associated with symbol $c_i$. In this case, the in-phase and quadrature components of symbol $c_i$ and the decision boundaries of the one-dimensional dynamic slicer 38 are integer multiples of $$|H|^2 = \left( \sum_{j=1}^{M} \sum_{i=1}^{N} |h_{ij}|^2 \right).$$

Since symbol $c_i$ may not be transmitted over every time slot for space-time block codes with rate R<1, $\hat{z}_i$ is a sum of the demodulated symbols corresponding only to the time slots where $c_i$ is transmitted.

Figure 7:
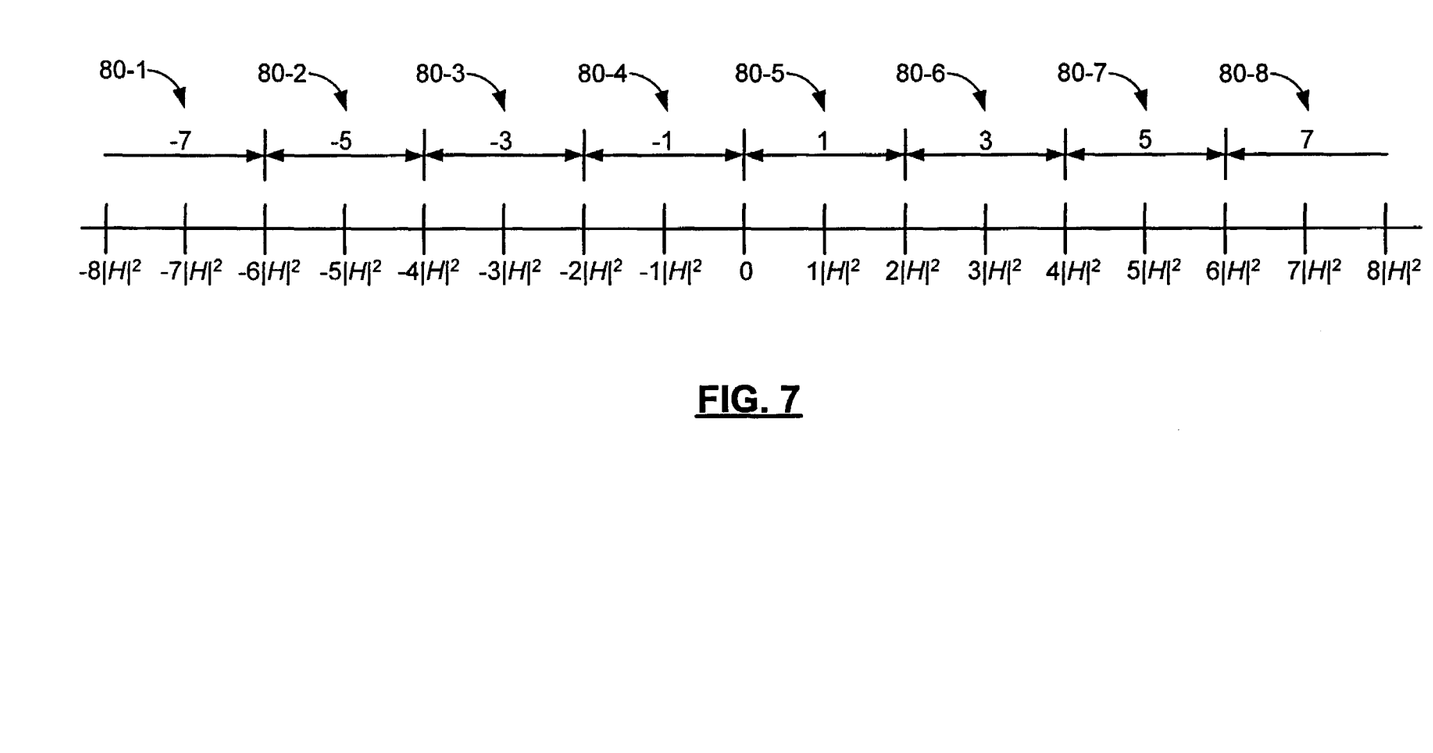
FIG. 7 illustrates decision regions from which the one-dimensional dynamic slicer generates a hard symbol decision.

Referring now to FIG. 7, $\Re\{z_1\}$ and $\Im\{z_1\}$ as well as decision boundaries 80-1 to 80-8 for the one-dimensional dynamic slicer 38 are integer multiples of $|H|^2$. Therefore, the one-dimensional dynamic slicer 38 compares $\Re\{z_1\}$ and $\Im\{z_1\}$ to integer multiples at the decision boundaries 80-1 to 80-8 to determine the in-phase or quadrature components of constellation points. For example, FIG. 7 illustrates a decision metric for constellations up to a 64-quadrature amplitude modulation (QAM) constellation. However, since FIG. 7 includes constellation points of ±1 to ±7, the decision metric also applies to quadrature phase shift keying (QPSK) and 16-QAM constellations. Additionally, FIG. 7 may be expanded to apply to a 256-QAM constellation. In the following dynamic slicer algorithms, $\bar{c}_i$ is a decoded in-phase or quadrature component of $\bar{z}_i$.

For QPSK, if $(\bar{z}_i \geq 0)$, then $\bar{c}_i = 1$. Otherwise, $\bar{c}_i = -1$.

For 16-QAM, if $((|\bar{z}_i| - 2|H|^2) \geq 0)$, then $\bar{c}_i = \pm 1$. Otherwise, $\bar{c}_i = \pm 3$. The sign of $\bar{c}_i$ is dependant on the sign of $\bar{z}_i$.

For 64-QAM, if $((|\bar{z}_i| - 2|H|^2) \leq 0)$, then $\bar{c}_i = \pm 1$. If $((|\bar{z}_i| - 4|H|^2) \leq 0)$, then $\bar{c}_i = \pm 3$. If $((|\bar{z}_i| - 6|H|^2) \leq 0)$, then $\bar{c}_i = \pm 5$. Otherwise, $\bar{c}_i = \pm 7$. As in 16-QAM, the sign of $\bar{c}_i$ is dependant on the sign of $\bar{z}_i$.

Figure 8A:
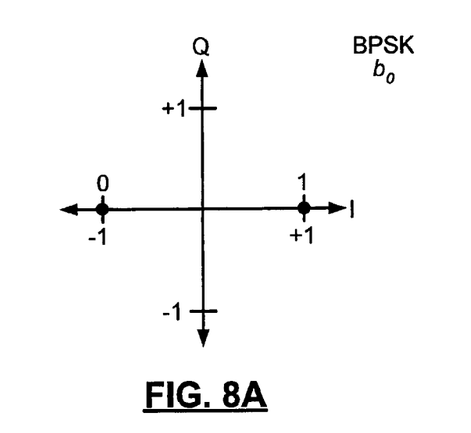
FIG. 8A illustrates constellation points in a BPSK signal constellation according to the IEEE 802.11a standard.
Figure 8B:
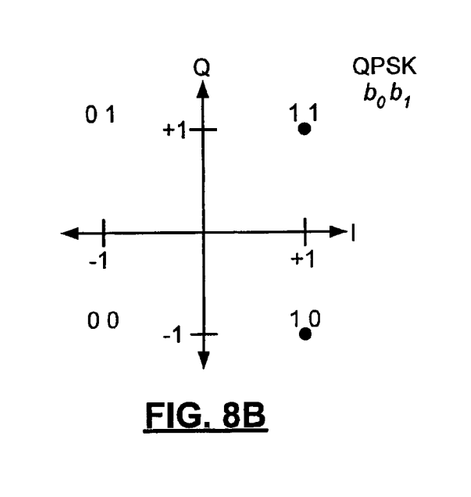
FIG. 8B illustrates complex constellation points in a QPSK signal constellation according to the IEEE 802.11a standard.
Figure 8C:
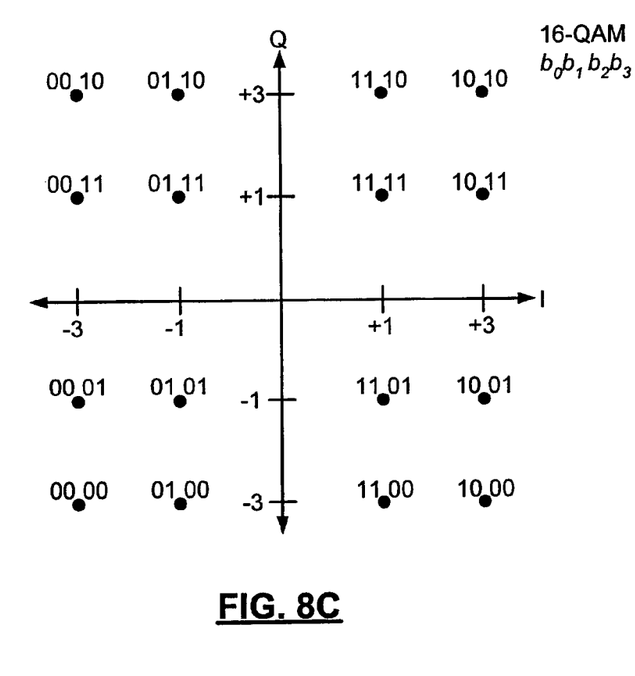
FIG. 8C illustrates complex constellation points in a 16-QAM signal constellation according to the IEEE 802.11a standard.
Figure 8D:
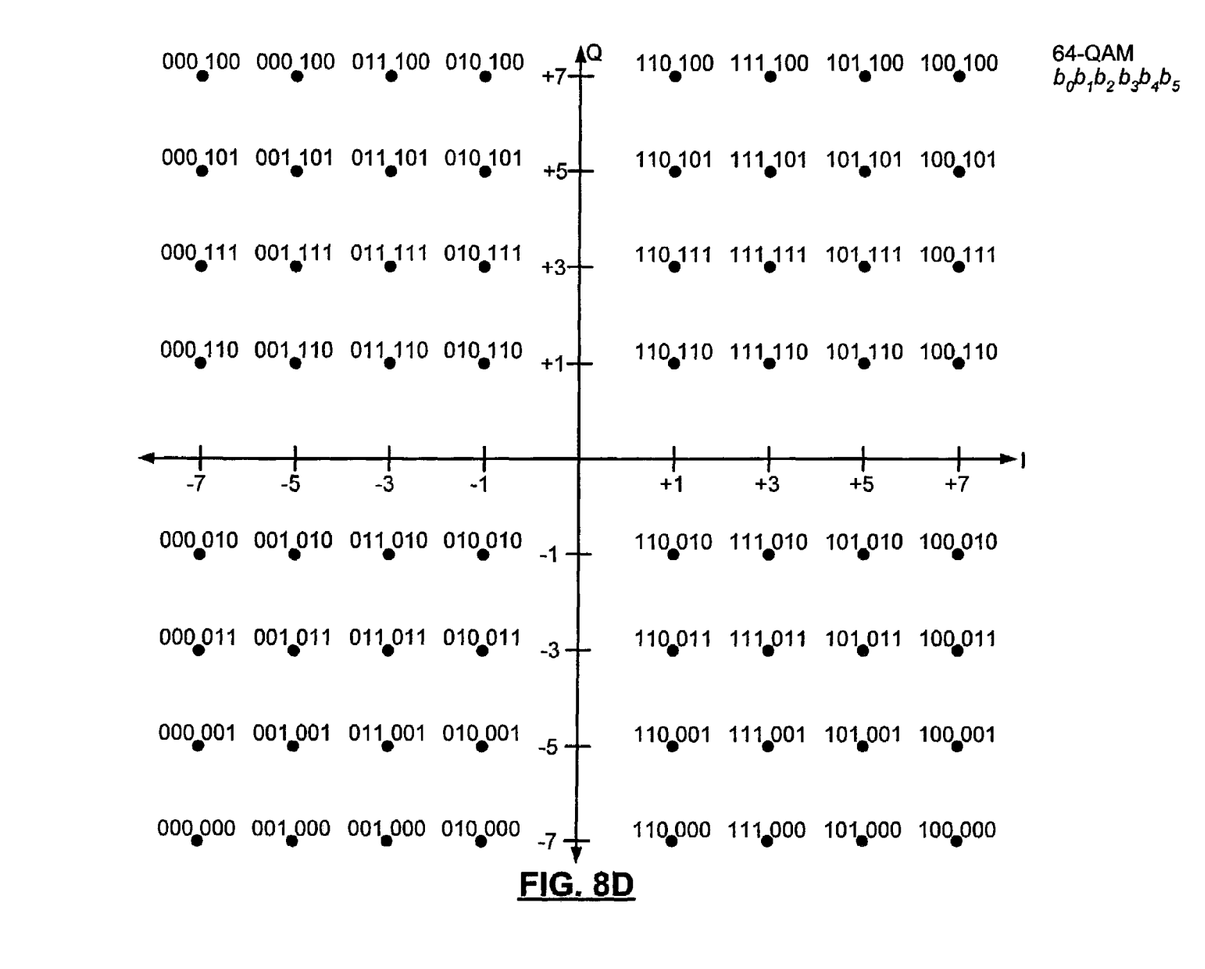
FIG. 8D illustrates complex constellation points in a 64-QAM signal constellation according to the IEEE 802.11a standard.

FIGS. 8A-8D illustrate constellation points in different signal constellations according to the IEEE 802.11a standard. In FIG. 8A, a bi-phase shift keying (BPSK) constellation includes constellation points of either 0 or 1. Therefore, a single decision boundary exists at 0 and the constellation points are one-dimensional. In FIG. 8B, a QPSK constellation includes four constellation points that comprise two bits each. The two bits include one in-phase bit and one quadrature bit. A single decision boundary exists at 0. In FIG. 8C, a 16-QAM constellation includes sixteen constellation points that comprise four bits each. The four bits include two in-phase bits and two quadrature bits. Since more than two constellation points exist on either side of 0, multiple decision boundaries exist. In FIG. 8D, a 64-QAM constellation includes 64 constellation points that comprise six bits each. The six bits include three in-phase bits and three quadrature bits. As in a 16-QAM constellation, multiple decision boundaries exist. Those skilled in the art can appreciate that the space-time block decoder 32 of the present invention may decode symbols that are encoded by signal constellations other than those illustrated in FIGS. 8A-8D.

Additionally, FIGS. 8A-8D illustrate Gray coded constellation points according to the IEEE 802.11a standard. For example, in a QPSK constellation, gray coded bit 0 maps to a one-dimensional constellation point −1 and gray coded bit 1 maps to a one-dimensional constellation point 1. In a 16-QAM constellation, gray coded bits 00 map to a one-dimensional constellation point −3, bits 01 map to a one-dimensional constellation point −1, bits 11 map to a one-dimensional constellation point 1, and bits 10 map to a one-dimensional constellation point 3. However, those skilled in the art can appreciate that other coding algorithms including alternative Gray coding algorithms may be implemented.

Figure 9:
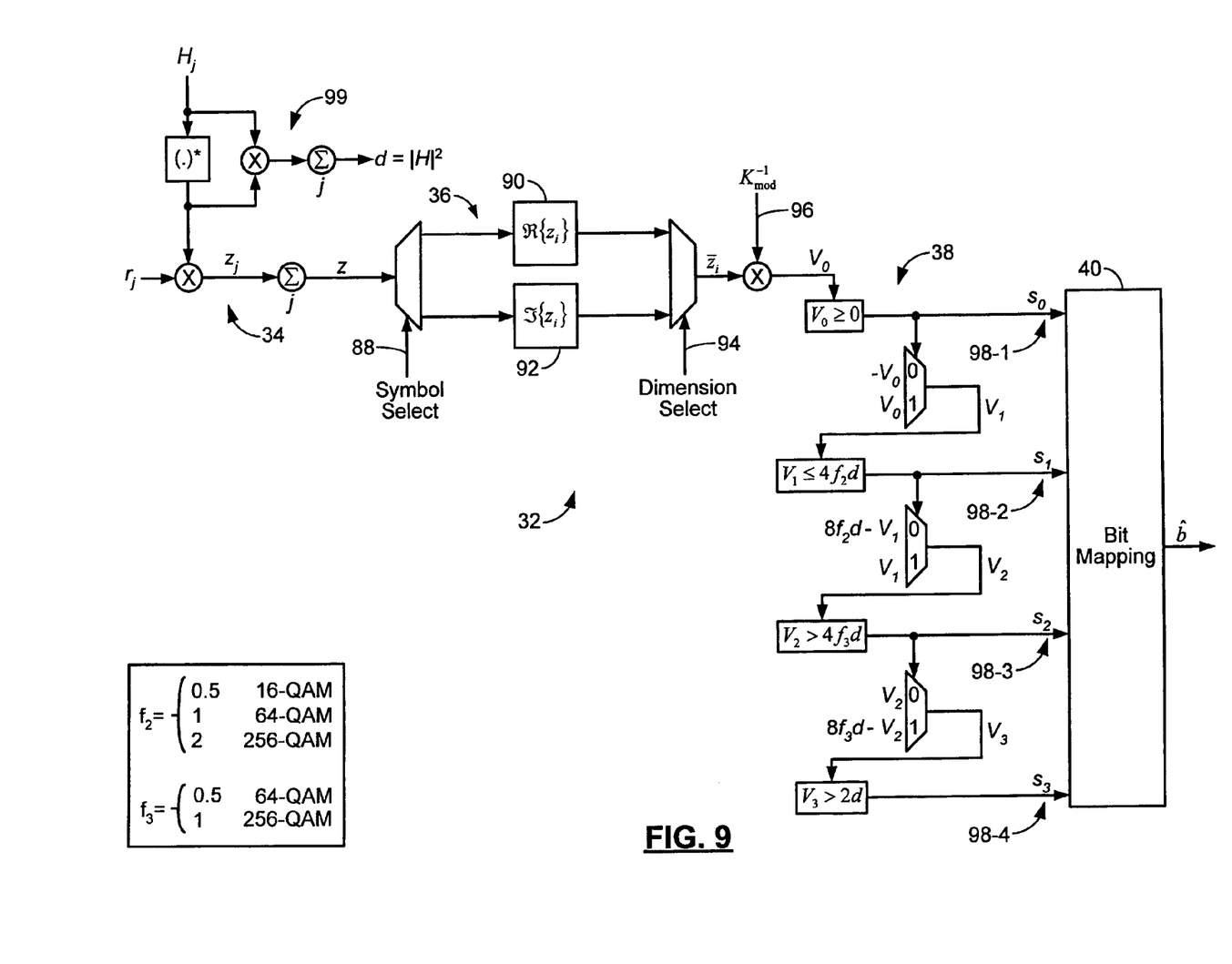
FIG. 9 further illustrates the space-time block encoder of FIG. 3 including an exemplary one-dimensional dynamic slicer.

Referring now to FIG. 9, at the demodulator 34, a received symbol sequence $r_j$ is multiplied by a conjugate of a channel response estimate $H_j^*$ to generate a demodulated symbol sequence z, which is decoupled. A symbol selection signal 88 determines which symbol in the demodulated symbol sequence z is decoupled by the I-Q demultiplexer 36. The I-Q demultiplexer 36 separates the in-phase and quadrature components, illustrated at 90 and 92, respectively, of the selected symbol. A dimension selection signal 94 determines whether the one-dimensional dynamic slicer 38 processes the in-phase or quadrature component. For example, the one-dimensional dynamic slicer 38 may first processes the in-phase component of the symbol followed by the quadrature component of the symbol. The in-phase and/or quadrature components may be multiplied by a scale factor signal 96 with a value $K_{mod}^{-1}$ to implement a normalized power scale, which depends on the current signal constellation.

The normalized value of $\bar{z}_i$, $V_o$, is passed on to stages 98-1, 98-2, 98-3, and 98-4 of an exemplary embodiment of the one-dimensional dynamic slicer 38. The one-dimensional dynamic slicer 38 illustrated in FIG. 9 includes four stages 98-1, 98-2, 98-3, and 98-4 and operates with signal constellations up to 256-QAM. Depending on the number of bits that represent a dimension of a constellation point in a signal constellation, some stages 98-1, 98-2, 98-3, and/or 98-4 may not be used. For example, a constellation point in a QPSK constellation is identified by two total bits and only uses the first stage 98-1. The in-phase bit and the quadrature bit are independently determined. A constellation point in a 16-QAM constellation is identified by four bits and uses the first two stages 98-1 and 98-2. A constellation point in a 64-QAM constellation utilizes three stages 98-1, 98-2, and 98-3 and includes six total bits. All four stages 98-1, 98-2, 98-3, and 98-4 are used for a one-dimensional constellation point in a 256-QAM constellation, which includes eight total bits. The output bits of the stages 98-1, 98-2, 98-3, and 98-4 are labeled $s_0$, $s_1$, $s_2$, and $s_3$, respectively. An input of the bit mapping module 40 receive the output bits. The bit mapping module 40 maps the output bits to user data bits $\hat{b}$.

At the first slicing stage 98-1, the variable $V_o$ takes on the value of a normalized $\bar{z}_i$. If $V_o$ greater than or equal to zero, $s_0 = 1$ and the value for $s_0$ determines the value for $V_1$ in the second stage 98-2. For example, if $s_0$ is equal to 1, then $V_1 = V_0$. If $s_0$ is equal to 0, then $V_1 = -V_0$. Therefore, $V_1$ will always be positive at the second stage 98-2. Additional stages may be added to the one-dimensional dynamic slicer 38 of FIG. 9 to operate with constellations greater than 256-QAM. The values for variables $f_2$ and $f_3$ depend on the current signal constellation. For the one-dimensional dynamic slicer 38 in FIG. 9, $f_2$ is equal to 0.5 for a 16-QAM constellation, $f_2$ is equal to 1 and $f_3$ is equal to 0.5 for a 64-QAM constellation, and $f_2$ is equal to 2 and $f_3$ is equal to 1 for a 256-QAM constellation. The variable d is equal to $|H|^2$, which is a sum of the product of $H_j$ and $H_j^*$ as illustrated at 99 in FIG. 9.

Figure 10:
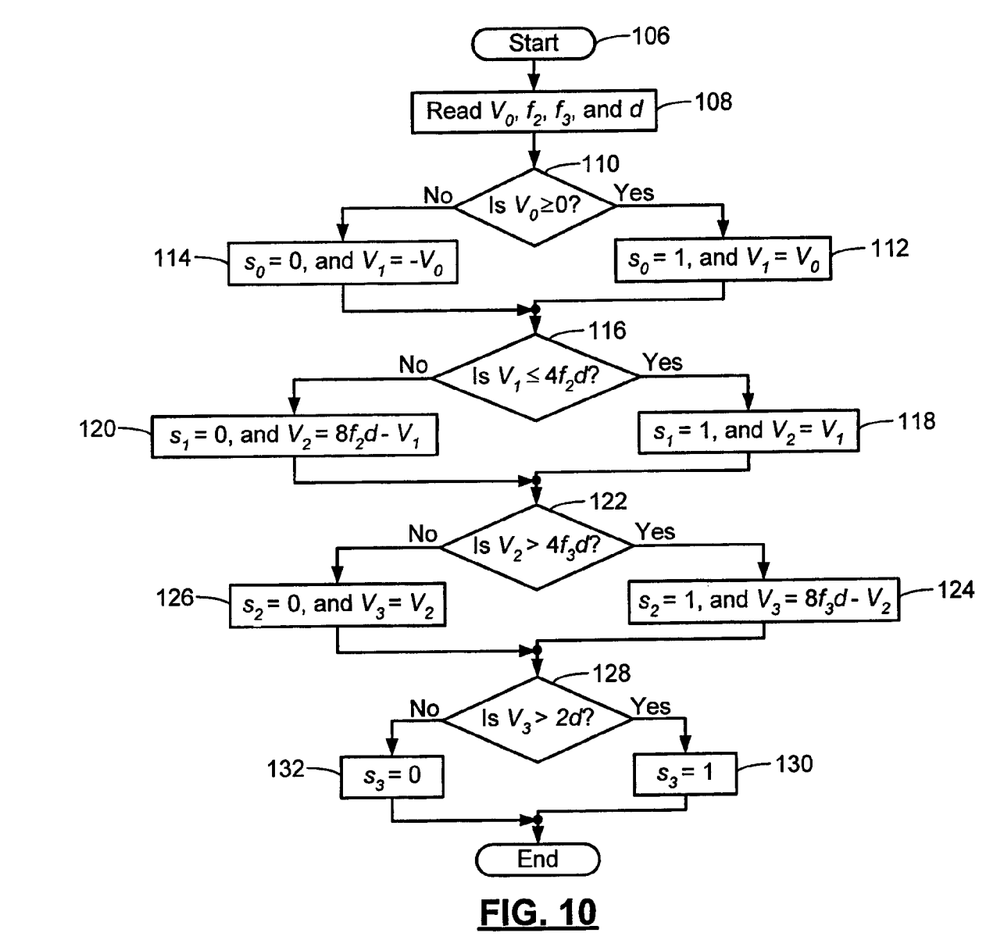
FIG. 10 is a flowchart illustrating steps performed by the exemplary one-dimensional dynamic slicer of FIG. 6.

Referring now to FIG. 10, a slicing algorithm according to the one-dimensional dynamic slicer 38 of FIG. 6 for a 256-QAM constellation begins in step 106. In step 108, the one-dimensional dynamic slicer 38 reads $V_0$, $f_2$, $f_3$, and d. In step 110, control determines whether $V_0$ is greater than or equal to 0. If true, control proceeds to step 112. If false, control proceeds to step 114. In step 112, $s_0$ is set equal to 1, $V_1$ is set equal to $V_0$, and control proceeds to step 116. In step 114, $s_0$ is set equal to 0, $V_1$ is set equal to $-V_0$, and control proceeds to step 116. In step 116, control determines whether $V_1$ is less than or equal to $4f_2d$. If true, control proceeds to step 118. If false, control proceeds to step 120. In step 118, $s_1$ is set equal to 1, $V_2$ is set equal to $V_1$, and control proceeds to step 122. In step 120, $s_1$ is set equal to 0, $V_2$ is set equal to $8f_2d-V_1$, and control proceeds to step 122. In step 122, control determines whether $V_2$ is greater than $4f_3d$. If true, control proceeds to step 124. If false, control proceeds to step 126. In step 124, $s_2$ is set equal to 1, $V_3$ is set equal to $8f_3d-V_2$, and control proceeds to step 128. In step 126, $s_2$ is set equal to 0, $V_3$ is set equal to $V_2$, and control proceeds to step 128. In step 128, control determines whether $V_3$ is greater than 2d. If true, control proceeds to step 130. If false, control proceeds to step 132. In step 130, $s_3$ is set equal to 1 and control ends. In step 132, $s_3$ is set equal to 0 and control ends.

The space-time block decoder 32 of the present invention allows a hard symbol decision to be made as every block of symbols is received. The space-time block decoder 32 is ideal for systems including an orthogonal block code and without an outer code. The orthogonal block code allows individual decoding of symbols in a block, and avoiding an outer code eliminates imposed sequence structures. However, a decoder that makes hard decisions on a symbol-by-symbol basis may still be beneficial for systems that use an outer code. In the event that $H=|H|e^{j\theta}$, variations of the demodulation process may be implemented. Such variations include using the phase $e^{-j\theta}$ instead of H*. In this case, those skilled in the art can appreciate that the scaling factor is altered accordingly.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A space-time block decoder for a wireless communications system, comprising:
   a demodulator that generates a demodulated symbol sequence by derotating a signal constellation of a received symbol sequence, wherein said demodulator derotates said signal constellation by multiplying said received symbol sequence and a conjugate of a channel response of said wireless communications system; and
   a dimension demultiplexer that communicates with said demodulator and that generates in-phase and quadrature components of said demodulated symbol sequence.

2. The space-time block decoder of claim 1 further comprising a one-dimensional dynamic slicer that communicates with said dimension demultiplexer and that generates constellation points in said signal constellation based on said in-phase and quadrature components.

3. The space-time block decoder of claim 1 further comprising a receiver that communicates with said space-time block decoder wherein said space-time block decoder individually decodes symbols in said received symbol sequence as said receiver receives said received symbol sequence.

4. The space-time block decoder of claim 1 wherein said one-dimensional dynamic slicer generates said constellation points by comparing said in-phase and quadrature components to integer multiples of a magnitude square of said channel response.

5. The space-time block decoder of claim 1 further comprising a receiver that communicates with said space-time block decoder and that includes one receive antenna.

6. The space-time block decoder of claim 5 wherein said receive antenna receives two symbols during first and second consecutive symbol periods.

7. The space-time block decoder of claim 1 further comprising a receiver that communicates with said space-time block decoder and that includes at least two receive antennae.

8. The space-time block decoder of claim 1 wherein at least one symbol in said received symbol sequence is encoded with an orthogonal space-time code.

9. The space-time block decoder of claim 1 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

10. The space-time block decoder of claim 1 wherein said space-time block decoder is implemented in a wireless metropolitan area network (WMAN).

11. The space-time block decoder of claim 1 wherein said space-time block decoder is implemented in a wireless local area network (WLAN).

12. The space-time block decoder of claim 1 wherein said space-time block decoder scales said in-phase and quadrature components to implement a normalized power scale that is based on said signal constellation.

13. The space-time block decoder of claim 1 wherein said constellation points are Gray coded.

14. The space-time block decoder of claim 2 further comprising:
   a bit mapping module that communicates with said one-dimensional dynamic slicer and that maps said constellation points to user data bits.

15. A wireless communications system, comprising:
   a receiving antenna that receives a symbol sequence; and
   a space-time block decoder that communicates with said receiving antenna, that generates user data based on said received symbol sequence, and that includes:
      a one-dimensional dynamic slicer that generates constellation points in a signal constellation of said received symbol sequence based on in-phase and quadrature components of a demodulated symbol sequence, wherein said demodulated symbol sequence is based on said received symbol sequence, and wherein said demodulator derotates said signal constellation by multiplying said received symbol sequence and a conjugate of a channel response of said wireless communications system.

16. The wireless communications system of claim 15 wherein said space-time block decoder individually decodes symbols in said received symbol sequence as said symbol sequence is received.

17. The wireless communications system of claim 15 wherein said space-time block decoder further includes a demodulator that communicates with said at least one receiving antenna and that generates said demodulated symbol sequence by derotating said signal constellation.

18. The wireless communications system of claim 17 wherein said space-time block decoder further includes a dimension demultiplexer that communicates with said demodulator and said one-dimensional dynamic slicer and that generates said in-phase and quadrature components.

19. The wireless communications system of claim 18 wherein said one-dimensional dynamic slicer generates said constellation points by comparing said in-phase and quadrature components to integer multiples of a magnitude square of said channel response.

20. The wireless communications system of claim 15 wherein said receiver includes one receive antenna.

21. The wireless communications system of claim 20 wherein said receive antenna receives two symbols during first and second consecutive symbol periods.

22. The wireless communications system of claim 15 wherein at least one symbol in said received symbol sequence is encoded with an orthogonal space-time code.

23. The wireless communications system of claim 15 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

24. The wireless communications system of claim 15 wherein said receiver is implemented in a wireless metropolitan area network (WMAN).

25. The wireless communications system of claim 15 wherein said receiver is implemented in a wireless local area network (WLAN).

26. The wireless communications system of claim 15 wherein said space-time block decoder scales said in-phase and quadrature components to implement a normalized power scale that is based on said signal constellation.

27. The wireless communications system of claim 15 wherein said constellation points are Gray coded.

28. The wireless communications system of claim 15 wherein said space-time block decoder includes a bit mapping module that communicates with said one-dimensional dynamic slicer and that maps said constellation points to said user data.

29. A space-time block decoder for a wireless communications system, comprising:
   demodulating means for generating a demodulated symbol sequence by derotating a signal constellation of a received symbol sequence, wherein said demodulating means derotates said signal constellation by multiplying said received symbol sequence and a conjugate of a channel response of said wireless communications system; and
   dimension demultiplexing means that communicates with said demodulating means for generating in-phase and quadrature components of said demodulated symbol sequence.

30. The space-time block decoder of claim 29 further comprising one-dimensional dynamic slicing means that communicates with said dimension demultiplexing means for generating constellation points in said signal constellation based on said in-phase and quadrature components.

31. The space-time block decoder of claim 29 further comprising receiving means for communicating with said space-time block decoder, wherein said space-time block decoder individually decodes symbols in said received symbol sequence as said receiving means receives said received symbol sequence.

32. The space-time block decoder of claim 29 wherein said one-dimensional dynamic slicing means generates said constellation points by comparing said in-phase and quadrature components to integer multiples of a magnitude square of said channel response.

33. The space-time block decoder of claim 29 wherein at least one symbol in said received symbol sequence is encoded with an orthogonal space-time code.

34. The space-time block decoder of claim 29 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

35. The space-time block decoder of claim 29 wherein said space-time block decoder is implemented in a wireless metropolitan area network (WMAN).

36. The space-time block decoder of claim 29 wherein said space-time block decoder is implemented in a wireless local area network (WLAN).

37. The space-time block decoder of claim 29 wherein said space-time block decoder scales said in-phase and quadrature components to implement a normalized power scale that is based on said signal constellation.

38. The space-time block decoder of claim 29 wherein said constellation points are Gray coded.

39. The space-time block decoder of claim 30, further comprising:
   bit mapping means that communicates with said one-dimensional dynamic slicing means for mapping said constellation points to user data.

40. A wireless communications system, comprising:
   receiving means for receiving a symbol sequence; and
   space-time block decoding means that communicates with said receiving means for generating user data based on said received symbol sequence, and that includes:
      one-dimensional dynamic slicing means for generating constellation points in a signal constellation of said received symbol sequence based on in-phase and quadrature components of a demodulated symbol sequence, wherein said demodulated symbol sequence is based on said received symbol sequence, wherein said space-time block decoding means includes demodulating means that communicates with said receiving means for generating said demodulated symbol sequence by derotating said signal constellation, and wherein said demodulating means derotates said signal constellation by multiplying said received symbol sequence and a conjugate of a channel response of said wireless communications system.

41. The wireless communications system of claim 40 wherein said space-time block decoding means individually decodes symbols in said received symbol sequence as said receiving means receives said symbol sequence.

42. The wireless communications system of claim 41 wherein said space-time block decoder includes dimension demultiplexing means that communicates with said demodulating means and said one-dimensional dynamic slicing means for generating said in-phase and quadrature components.

43. The wireless communications system of claim 40 wherein said one-dimensional dynamic slicing means generates said constellation points by comparing said in-phase and quadrature components to integer multiples of a magnitude square of said channel response.

44. The wireless communications system of claim 40 wherein at least one symbol in said received symbol sequence is encoded with an orthogonal space-time code.

45. The wireless communications system of claim 40 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

46. The wireless communications system of claim 40 wherein said wireless communications system implements a wireless metropolitan area network (WMAN).

47. The wireless communications system of claim 40 wherein said wireless communications system implements a wireless local area network (WLAN).

48. The wireless communications system of claim 40 wherein said space-time block decoding means scales said in-phase and quadrature components to implement a normalized power scale that is based on said signal constellation.

49. The wireless communications system of claim 40 wherein said constellation points are Gray coded.

50. The wireless communications system of claim 40 wherein said space-time block decoding means includes bit mapping means that communicates with said one-dimensional dynamic slicing means for mapping said constellation points to said user data bits.

51. A method of operating a space-time block decoder for a wireless communications system, comprising:
generating a demodulated symbol sequence by derotating a signal constellation of a received symbol sequence by multiplying said received symbol sequence and a conjugate of a channel response of said wireless communications system; and
generating in-phase and quadrature components of said demodulated symbol sequence.

52. The method of claim 51 further comprising generating constellation points in said signal constellation based on said in-phase and quadrature components.

53. The method of claim 51 further comprising individually decoding symbols in said received symbol sequence said symbol sequence is received.

54. The method of claim 51 further comprising generating said constellation points by comparing said in-phase and quadrature components to integer multiples of a magnitude square of said channel response.

55. The method of claim 51 wherein at least one symbol in said received symbol sequence is encoded with an orthogonal space-time code.

56. The method of claim 51 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

57. The method of claim 51 wherein said space-time block decoder is implemented in a wireless metropolitan area network (WMAN).

58. The method of claim 51 wherein said space-time block decoder is implemented in a wireless local area network (WLAN).

59. The method of claim 51 further comprising scaling said in-phase and quadrature components to implement a normalized power scale that is based on said signal constellation.

60. The method of claim 51 wherein said constellation points are Gray coded.

61. The method of claim 52 further comprising mapping said constellation points to user data.

62. A method of operating a wireless communications system, comprising:
receiving a symbol sequence;
generating user data based on said received symbol sequence by generating constellation points in a signal constellation of said received symbol sequence based on in-phase and quadrature components of a demodulated symbol sequence,
wherein said demodulated symbol sequence is based on said received symbol sequence; and
generating said demodulated symbol sequence by derotating said signal constellation by multiplying said received symbol sequence and a conjugate of a channel response of said wireless communications system.

63. The method of claim 62 further comprising individually decoding symbols in said symbol sequence as said symbol sequence is received.

64. The method of claim 62 further comprising comparing said in-phase and quadrature components to integer multiples of a magnitude square of said channel response.

65. The method of claim 62 wherein said signal constellation is generated by one of a bi-phase shift keying (BPSK) code, a quadrature phase shift keying (QPSK) code, a 16-quadrature amplitude modulation (QAM) code, a 64-QAM code, and a 256-QAM code.

66. The method of claim 62 wherein said wireless communications system implements a wireless metropolitan area network (WMAN).

67. The method of claim 62 wherein said wireless communications system implements a wireless local area network (WLAN).

68. The method of claim 62 further comprising scaling said in-phase and quadrature components to implement a normalized power scale that is based on said signal constellation.

69. The method of claim 62 wherein said constellation points are Gray coded.

70. The method of claim 62 further comprising mapping said constellation points to said user data.

\* \* \* \* \*

UNITED STATES PATENT AND TRADEMARK OFFICE
CERTIFICATE OF CORRECTION

PATENT NO. : 7,372,919 B1  Page 1 of 1
APPLICATION NO. : 10/667632
DATED : May 19, 2008
INVENTOR(S) : Hui-Ling Lou et al.

It is certified that error appears in the above-identified patent and that said Letters Patent is hereby corrected as shown below:

| | |
|---|---|
| Column 7, Line 38 | Delete "≥" and insert -- ≤ -- |
| Column 2, Line 17 | Delete "," before "." |
| Column 2, Line 32 | Delete "$r_1$" and insert -- r, -- |
| Column 2, Line 42 | Delete "$r^{2n}$" and insert -- $r_{2n}$ -- |
| Column 3, Line 10 | Insert -- that -- after "decoder" |
| Column 6, Line 66 | Delete " $\hat{z}_i$ " and insert -- $\bar{z}_i$ -- |
| Column 7, Line 17 | Delete " $\hat{z}_i$ " and insert -- $\bar{z}_i$ -- |
| Column 8, Line 53 | Insert -- is -- after "$V_0$" |

Signed and Sealed this

Nineteenth Day of August, 2008

JON W. DUDAS
*Director of the United States Patent and Trademark Office*